United States Patent [19]

Tanaka

[11] Patent Number: 4,679,208
[45] Date of Patent: Jul. 7, 1987

[54] EQUALIZATION SYSTEM TUNING DEVICE WHICH UPDATES EQUALIZER COEFFICIENTS BASED ON SELECTED DECISION REGIONS

[75] Inventor: Shigetaka Tanaka, Atsugi, Japan

[73] Assignee: Ricoh Company, Ltd., Tokyo, Japan

[21] Appl. No.: 760,116

[22] Filed: Jul. 29, 1985

[30] Foreign Application Priority Data

Jul. 31, 1984 [JP] Japan .................. 59-158570

[51] Int. Cl.⁴ .................................. H04B 3/10
[52] U.S. Cl. ................................ 375/13; 375/14
[58] Field of Search ................ 375/12, 13, 14, 15; 333/18; 364/724

[56] References Cited

U.S. PATENT DOCUMENTS

| | | | |
|---|---|---|---|
| 4,227,152 | 10/1980 | Godard et al. | 375/14 |
| 4,253,184 | 2/1981 | Gitlin et al. | 333/18 |
| 4,253,186 | 2/1981 | Godard | 375/15 |
| 4,388,724 | 6/1983 | Göckler | 333/18 |

FOREIGN PATENT DOCUMENTS 57-111135  7/1982  Japan ...................... 375/12

Primary Examiner—Robert L. Griffin
Assistant Examiner—M. Huseman
Attorney, Agent, or Firm—Oblon, Fisher, Spivak, McClelland & Maier

[57] ABSTRACT

An equalization system wherein a signal received over a line is equalized and the quantity of equalization is compensated based on a difference, or error, between the equalized received signal and a signal which is estimated from the received signal, including a tuning device which compensates the amount of equalization by training, which precedes reception of communication data. A difference or error range which is usable for the compensation of the quantity of equalization is set up during a training sequence. The error range sequentially increases as the training sequence proceeds. Thus, decision feedback updating during the training sequence only occurs so long as the difference between the equalized received signal and a signal which is estimated from the received signal is within the error range, which is sequentially increased during a training sequence. After completion of the training sequence decision feedback updating is always allowed.

5 Claims, 12 Drawing Figures

EQUALIZATION SYSTEM TUNING DEVICE WHICH UPDATES EQUALIZER COEFFICIENTS BASED ON SELECTED DECISION REGIONS

BACKGROUND OF THE INVENTION

The present invention relates to a communication system and, more particularly, to a tuning device for an equalization system applicable to data signalling.

In the data signalling art, tuning systems, or adaptive control systems, associated with modulated signals heretofore proposed include a decision reference system. A decision reference is more advantageously applicable to a system with relatively small intersymbol interference than an absolute reference and makes the mutual interference insignificant. In that case, a relatively short tuning and a small hardware scale suffice. An output signal of an equalizer which is adapted to equalize a signal received over a circuit may be developed in various eye patterns depending upon the phase and amplitude distortions which the received signal have suffers due to circuit. The situation concerning the decision of symbols of received signals is most delicate when the signals are significantly distorted in phase through the circuit. The fluctuation in the phase of a carrier is indefinite so that in the case of symbol decision which uses two levels, for example, the phase sometimes vary over the two discrete decision ranges. Then, those symbols which accidentally lie in an unexpected one of the decision ranges commands the equalizer to erroneously correct equalization parameters.

One approach for solving the above problem is disclosed in Japanese Unexamined Patent Publication (Kokai or Kaku), No. 57-111135, for example. In accordance with the disclosed tuning system, an insensitive area, for symbol decision is set up in a phase plane and, when a received signal lies in the insensitive area, correction on the equalizer which is based on an error of the received signal relative to a reference signal is not performed.

As well known in the art, in a demodulator system which includes an equalizer, a equalizer section of the demodulator is trained before the reception of desired data signals over a circuit. During a training sequence, the symbol usually changes from a two-phase symbol to a multi-phase symbol as the sequence proceeds. As prescribed by CCITT Recommendation V.27ter, for example, two-phase symbols may be used to segment 4 and, then, four- or eight-phase symbols in segment 5. Such is effective to efficiently converge various parameters of the equalization system.

In the prior art system which sets up an insensitive area as described, the insensitive area is unchangeable, or fixed. Because the training sequence is of the two-phase type, the decision of an insensitive area can be made with ease. However, if convergence is not attained within the conditioning pattern of the equalizer (segment 4 in CCITT V27ter), it will not be attained thereafter. That is, even after the equalization system has begun to converge, the error correcting function is limited to in turn limit the attainable degree of equalization.

SUMMARY OF THE INVENTION

It is therefore an object of the present invention to eliminate the drawback particular to the prior art technique as discussed above and to provide a tuning device for an equalization system which realizes desirable tuning, or adaptive control, with a minimum of symbol decision error.

It is another object of the present invention to provide a generally improved tuning device for an equalization system.

In accordance with the present invention, there is provided an equalization system wherein a signal received over a line is equalized and the quantity of equalization is compensated based on a difference, or error, between the equalized received signal and a signal which is estimated from the received signal, including a tuning device which compensates the amount of equalization by training, which precedes reception of communication data. A difference or error range which is usable for the compensation of the quantity of equalization is set up during the training. The error range sequentially increases as the training proceeds. Thus, decision feedback updating during the training sequence only occurs so long as the difference between the equalized received signal and a signal which is estimated from the received signal is within the error range, which is sequentially increased during a training sequence. After completion of the training sequence decision feedback updating is always allowed.

The above and other objects, features and advantages of the present invention will become more apparent from the following detailed description taken with the accompanying drawings.

DESCRIPTION OF THE PREFERRED EMBODIMENTS

While the tuning device for an equalization system of the present invention is susceptible of numerous physical embodiments, depending upon the environment and requirements of use, a substantial number of the herein shown and described embodiments have been made, tested and used, and all have performed in an eminently satisfactory manner.

Figure 1:
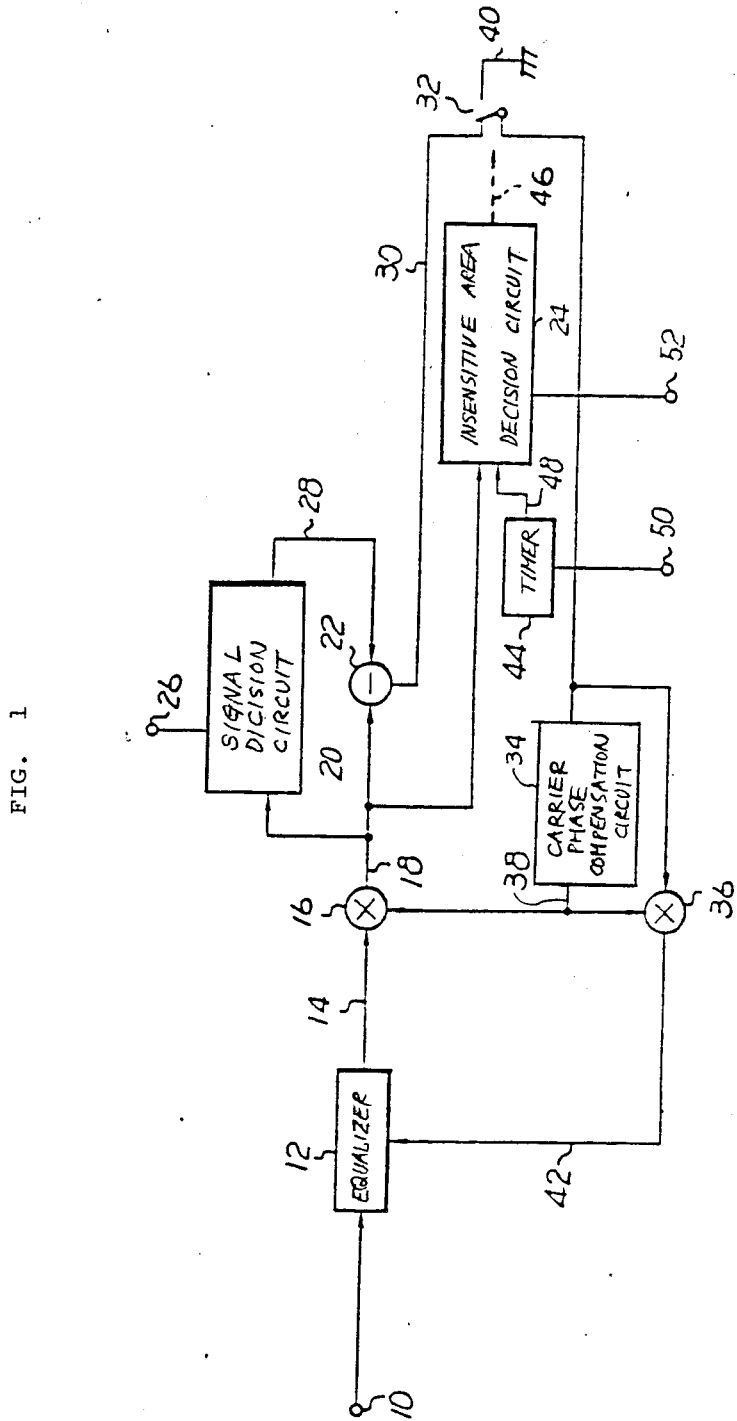
FIG. 1 is a block diagram of a tuning device for an equalization system embodying the present invention.

Referring to FIG. 1 of the drawings, a tuning device in accordance with the present invention is shown. The tuning device includes an equalizer 12 which is interconnected to an input terminal 10 which in turn is connected to a circuit or transmission channel for receiving a signal over the circuit. An output 14 of the equalizer 12 is interconnected to a multiplier 16. The equalizer 12 serves to equalize the received signal responsive to the characteristics of the circuit network to which the input terminal 10 is connected. In practice, an output signal of the equalizer 12 is made up of an in-phase component R and an orthogonal component I. An output of the multiplier 16 is interconnected to a signal decision circuit 20, a subtractor 22 and an insensitive area decision circuit 24. Connected to a control input 48 of the decision circuit 24 is a timer 44 which is a timing circit adapted to set up a timing for varying decision lines of the insensitive area of the decision circuit 24.

The signal decision circuit 20 functions to determine a phase of a received signal on the basis of a reference signal which is applied to its terminal 26. The result of decision is routed from an output 28 of the decision circuit 20 to the subtractor 22 which then provides a difference between the result of decision and the received signal. The difference, or error, 30 is fed via a switch 32 to a carrier phase compensation circuit 34 and a multiplier 36. The other terminal 40 of the switch 32 is connected to ground. An output 38 of the carrier phase compensation circuit 34 is coupled to the multiplier 16 to complete a feedback integration loop. An output 42 of the multiplier 36 is interconnected to the equalizer 12.

Figure 2:
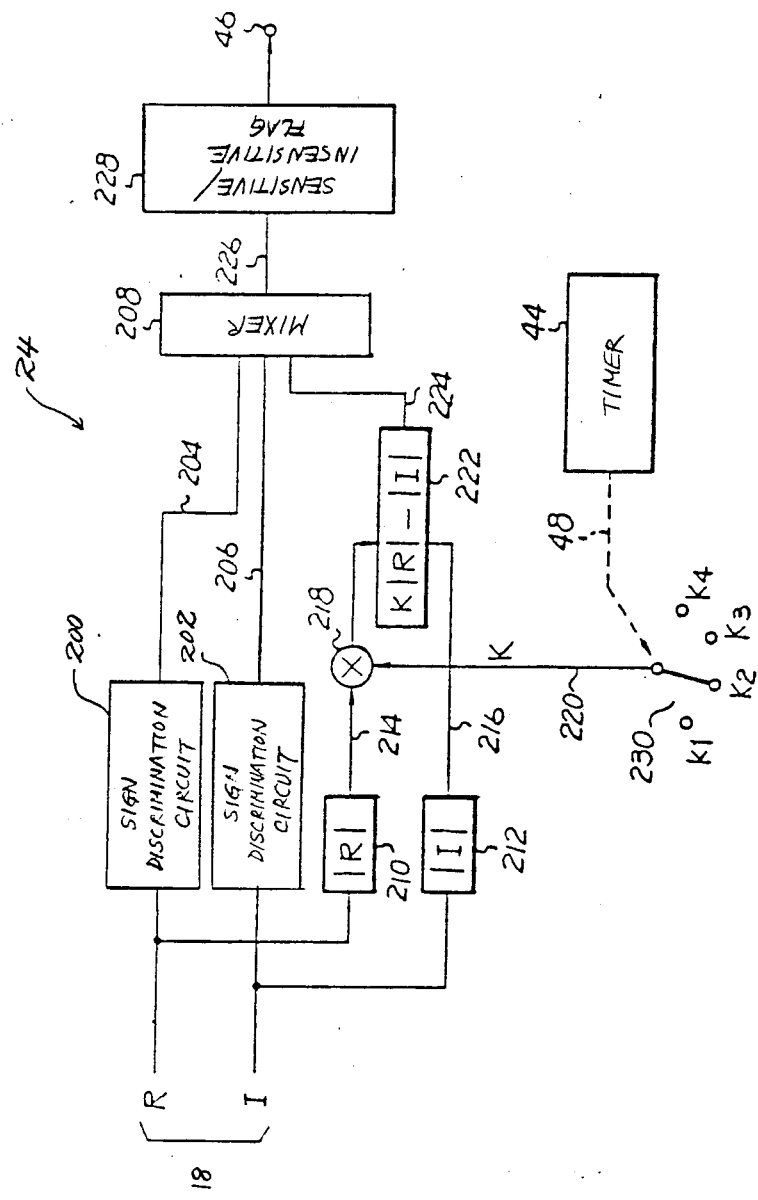
FIG. 2 is a block diagram showing a specific construction of an insensitive area decision circuit which is included in the device of FIG. 1.

The circuit elements described so far may advantageously be implemented by a digital signal processing device together with a construction which will be described with reference to FIG. 2 and a control system for a demodulator in which the device of the present invention is included. FIGS. 1 and 2 schematically illustrate functions which are attainable with the processing device.

Figure 3A:
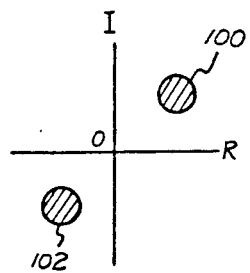
FIGS. 3A-3C, 4A, 4B, 5A, 5B and 6A-6C are signal space diagrams representative of the operation of the device shown in FIGS. 1 and 2.
Figure 3B:
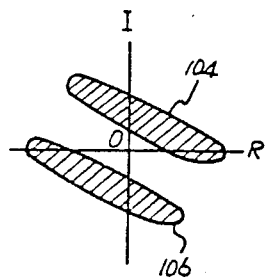
Figure 3C:
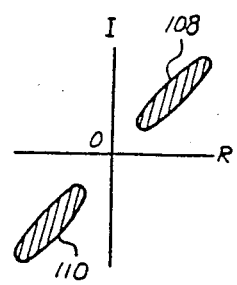

As generally accepted, signals received over a circuit characteristics of which have been deteriorated belong to anyone of three different kinds of patterns which developed in a phase plane; typically, as shown in FIGS. 3A-3C, patterns 100 and 102 in which the phase and the amplitude are distorted substantially to the same degree, pattern 104 and 106 in which the phase is more distorted than the amplitude, and patterns 108 and 110 in which the amplitude is more distorted than the phase.

Figure 4A:
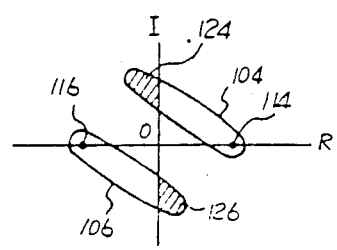
Figure 4B:
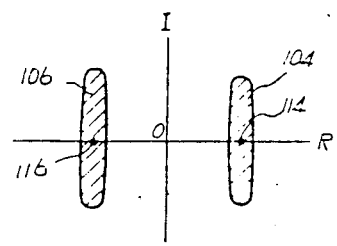

As previously stated, it is the pattern in which the phase distortion is greater than the amplitude distortion, i.e., patterns 104 and 106, that is most critical even when the decision reference is used. Insofar as the phase distortions are confined in the respective decision ranges, as shown in FIG. 4B, no decision error develops. However, as shown in FIG. 4B, where each of the distribution patterns 104 and 106 of received signal points with respect to ideal symbol points 114 and 116 intrudes into the other's decision range, decision errors occur in hatched areas 124 and 126.

Figure 5A:
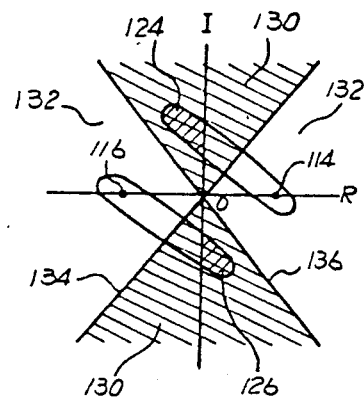
Figure 5B:
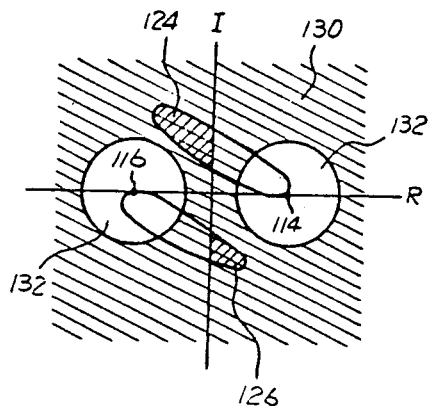

In order to eliminate such decision errors, the insensitive area decision circuit 24 sets up an insensitive area as represented by a hatched region 130 in FIG. 5A by way of example. When the received signal lies in this particular area 130, correction of equalization parameters assigned to the equalizer 12 which is based on phase errors does not occur.

More particularly, where the signal on the output 18 of the multiplier 16 lies in a sensitive area 132, the insensitive area decision circuit 24 actuates the switch 32 to the illustrated position by its output 46 so as to apply an output of the subtractor 22 to the carrier phase compensation circuit 34 and multiplier 36. On the other hand, where the signal on the output 18 lies in the insensitive area 130, the circuit 24 inverts the position of the switch 32 from the illustrated position by its output 46 to connect ground potential to the compensation circuit 34 and multiplier 36.

In this particular embodiment, the insensitive area decision circuit 24 is constructed as shown in FIG. 2. The signal routed from the output 18 of the multiplier 16 to the decision circuit 24 is provided as a vector $R+jI$ which is represented by an inphase component R and an orthogonal component I. Hence, if signs (positive or negative) of the components R and I are known, it is possible to identify the positions of four phases in the phase plane. The role of so identifying the signs is played by sign discrimination circuits 200 and 202 to which the in-phase component R and the orthogonal component I respectively are applied. Outputs 204 and 206 of these circuits 200 and 202 are fed to a mixer 208.

The in-phase component R and the orthogonal component I of the input signal are also routed to absolute value circuits 210 and 212, respectively. An output 214 of the absolute value circuit 210 associated with the in-phase component R is applied to a multiplier 218 to be multiplied by a constant K. In this particular embodiment, the constant K is selected from K1-K4 by a switch 230 which is operated by a timer 44. The resulting output of the multiplier 218 K $|R|$, is fed to a subtractor 222 which provides a difference between the multiplier output and the orthogonal component $|I|$ which is applied thereto from the absolute value circuit 212.

Figure 6A:
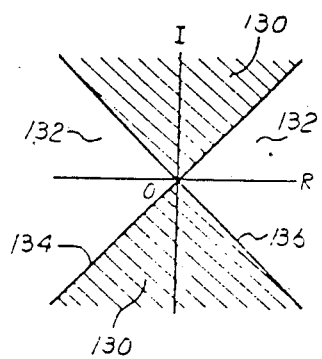
Figure 6B:
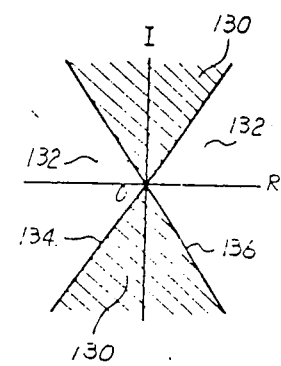
Figure 6C:
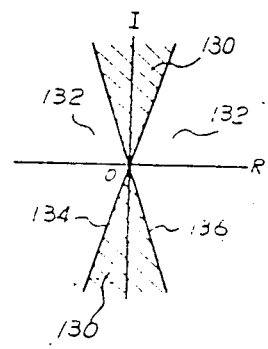

In the illustrative embodiment, the insensitive area 130 is defined by two lines 134 and 136 which pass through the origin in the phase plane. The insenstive area decision circuit 24 is constructed so that the gradient K of the lines 134 and 136 is variable as shown in FIGS. 6A-6C by way of example, responsive to a control signal which comes in through the control input 48.

In this particular embodiment, the control for allowing the insensitive area 130 to vary is performed such that the insensitive area 130 becomes narrower with time during a training sequence of the demodulator in which the device of the present invention is included. Therefore, the timer 44 is triggered by a signal which is applied from the control system associated with the demodulator to a control input 50 of the timer 44 upon the start of the training sequence. Such a timer 44 may advantageously be implemented by a counter.

For example, before the timer 44 reaches a predetermined value, or count, C1, lines which are provided by $|R|=|I|$ are used as decision lines. After the time 22 has incremented beyond the count C1 and before it reaches another predetermined count C2, lines provided by $K1\cdot|R|=|I|$ are used as decision lines, where the constant K1 is greater than 1. In this manner, as the training sequence proceeds, the insensitive area 130 is narrowed sequentially and stepwisely.

The results of sign discrimination provided by the sign discrimination circuits 200 and 202 and the error 224 provided by the subtractor 222 are applied to the mixer 208. The mixer 208 produces a signal 226 indicative of whether or not the received signal lies in the insensitive area 130 referencing the signs of the inputs and the four phases defined by the four decision lines. A sensitive/insensitive flag 228 is set responsive to the signal 226. An output 46 of the flag 228 is applied to the switch 32 for controlling it.

As the training sequence proceeds to complete a two-phase mode, the insensitive area decision circuit 24 stops discriminating the insensitive area responsive to a signal which is then applied from the control system to a control input 52. As a result, in a multi-phase mode of the training, the error signal output 30 of the subtractor 22 is directly applied to the carrier wave compensation circuit 34 and multiplier 36.

The compensation circuit 34 subjects the error signal 30 to integration for removing frequency offsets and integration for removing phase jitters, a sum of the results being adapted to compensate the phase of the output of the equalizer 12. This effects a control for equalizing the phase of the received signal to that of the reference signal.

The decision line data $|R|=|I|$ is also applied to the signal decision circuit 20 as a reference signal 26. The decision circuit 20 is allowed to identify eight signal phases using the reference signal 26 and the signs of the in-phase component R and orthogonal component I. Regarding a two-phase mode, the phases will be identified using only the signs of the in-phase component R and orthogonal component I.

In summary, it will be seen that the present invention provides a tuning device for an equalization system which sequentially narrows an insensitive area for correction of equalization parameters with the lapse of time so as to complete a sufficient degree of equalization before a multi-mode of a training sequence is reached and, thereby, minimizes decision error even if the equalization system is tuned by use of a decision reference on a signal which has been received over a significantly deteriorated circuit.

Various modifications will become possible for those skilled in the art after receiving the teachings of the present disclosure without departing from the scope thereof. For example, the sensitive area 132 may have a circular, oblong or any other suitable shape, in which case the control during the training sequence will occur such that the radius of the circular area 132, for example, is variable with time.

What is claimed is:

1. A tuning device for an equalization system in which a known training pattern is transmitted to facilitate equalization of subsequently transmitted data whenever said data is to be transmitted, comprising:
    equalizer means for equalizing a signal received over a signal transmission channel with respect to a characteristic of said signal transmission channel;
    first multiplier means supplied with the received signal which has been equalized by said equalizer means;
    signal decision means for discriminating a phase of an output signal of said first multiplier means in relation to the phase of a reference signal;
    subtractor means for providing a difference, or error, between the output signal of the first multiplier means and an output signal of the signal decision means which is representative of a discriminated phase, and producing an error signal;
    second multiplier means supplied with the error signal from said subtractor means for supplying an output signal of said second multiplier means to the equalizer means;
    carrier phase compensation means supplied with the error signal from the subtractor means for applying an output of said carrier phase compensation means to the first and second multiplier means;
    insensitive area decision means supplied with the output signal of the first multiplier means for, when the output signal of the first multiplier means lies in a sensitive area defined as a predetermined region of a phase plane in which convergence of equalizer coefficients to desired values is relatively likely to occur, causing the error signal from the subtractor means to be applied to said carrier phase compensation means and the second multiplier means and, when the output signal of the first multiplier means lies in an insensitive area defined as regions of the phase plane outside of the sensitive area where convergence of equalizer coefficients to the desired values is less likely to occur than in the sensitive area, interrupting the supply of the error signal from the subtractor means to the carrier phase compensation means and the second multiplier means thereby disabling operation of the carrier phase compensation means and the second multiplier means, said insensitive area decision means comprising means for producing decision lines which define boundaries of said sensitive and insensitive areas; and
    means for varying said decision lines during reception of said training pattern so that the sensitive area is increased.

2. A tuning device for an equalization system according to claim 1, wherein said means for varying said decision lines comprises:
    timer means for specifying a timing for varying said decision lines; and
    means for sequentially varying said decision lines so that the sensitive area is sequentially increased at a rate determined by said timer means.

3. A tuning device for an equalization system as claimed in claim 1, wherein the output signal of the first multiplier means is provided as a vector represented by an in-phase component and an orthogonal component in the phase plane.

4. A tuning device as claimed in claim 3, wherein the insensitive area decision means comprises first and second sign discriminating means supplied respectively with the in-phase component and the orthogonal component of the output signal of the first multiplier means for identifying positive/negative signs of the in-phase and orthogonal components, first and second absolute value calculating means respectively with the in-phase and orthogonal components of the output signal of the first multiplier means for calculating absolute values of the in-phase and orthogonal values, third multiplier means for multiplying the absolute value of the in-phase component calculated by said first absolute value calculating means by a predetermined constant, second subtractor means for subtracting the absolute value of the orthogonal component calculated by the second absolute value calculating means from a product of the absolute value of the in-phase component and the constant provided by said third multiplier means, and mixing means supplied with an output of the first and second sign discriminating means for determining whether or not the received signal lies in the insensitive area and setting a sensitive/insensitive flag based on a result of the determination.

5. A tuning device for an equalization system as claimed in claim 4, wherein the insensitive area decision means further comprises switch means operated by the timer means for selectively supplying the predetermined constant to the third multiplier means.

* * * * *